United States Patent
Aldana et al.

(10) Patent No.: US 11,899,090 B2
(45) Date of Patent: Feb. 13, 2024

(54) SYSTEMS AND METHODS FOR ULTRA-WIDEBAND-BASED ANGLE OF APPROACH DETERMINATION

(71) Applicant: Meta Platforms Technologies, LLC, Menlo Park, CA (US)

(72) Inventors: Carlos Horacio Aldana, Mountain View, CA (US); Abhishek Kumar Agrawal, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 340 days.

(21) Appl. No.: 17/461,605

(22) Filed: Aug. 30, 2021

(65) Prior Publication Data
US 2023/0064143 A1 Mar. 2, 2023

(51) Int. Cl.
H04W 64/00 (2009.01)
H04W 4/02 (2018.01)
G01S 1/08 (2006.01)
G01S 13/02 (2006.01)

(52) U.S. Cl.
CPC ............ *G01S 1/08* (2013.01); *G01S 13/0209* (2013.01); *G01S 13/0218* (2013.01)

(58) Field of Classification Search
CPC ..... G01S 1/08; G01S 13/0209; G01S 13/0218
See application file for complete search history.

(56) References Cited

U.S. PATENT DOCUMENTS

2021/0076350 A1* 3/2021 Yang .................... G01S 3/50
2022/0116088 A1* 4/2022 Wang .................. H04B 7/086

FOREIGN PATENT DOCUMENTS

EP    3502729 A1    6/2019
WO    2017198037 A1    11/2017

OTHER PUBLICATIONS

International Search report and Written Opinion for International Application No. PCT/US2022/041752, dated Dec. 2, 2022, 7 pages.

* cited by examiner

*Primary Examiner* — Moustapha Diaby
(74) *Attorney, Agent, or Firm* — Foley & Lardner LLP

(57) ABSTRACT

Disclosed herein are related to a system and a method for determining an Angle of Approach (AoA) of a device. A first device may receive a report from a second device having a plurality of ultra-wideband (UWB) devices. The report may include a plurality of values comprising an elevation component and an azimuth component of the AoA from the first device. At least some of the plurality of values may be obtained according to measurements between the plurality of UWB devices of the second devices and the at least one UWB device of the first device. The first device may determine an AoA from the second device, using the plurality of values from the report received from the second device.

20 Claims, 6 Drawing Sheets

SYSTEMS AND METHODS FOR ULTRA-WIDEBAND-BASED ANGLE OF APPROACH DETERMINATION

FIELD OF DISCLOSURE

The present disclosure is generally related to determining an angle of approach (AoA), including but not limited to systems and methods for ultra-wideband-based AoA determination.

BACKGROUND

Ultra-wideband (UWB) technology provides for precise ranging between two devices having UWB devices or transceivers. Some devices may determine an AoA of another device. For a device to determine an AoA from another device, the device may need to include multiple antennas for making such a determination. However, incorporating multiple UWB devices or transceivers into individual devices may be cost-prohibitive, both from a financial standpoint and from a space standpoint.

SUMMARY

Various embodiments disclosed herein are related to determining an Angle of Approach (AoA) using measurement reports shared between two devices. Using the systems and methods described herein, a first device (which may have more simplified hardware) may leverage a measurement report received from a second device to calculate the AoA of the first device with respect to the second device. The first device may include a compass and accelerometer(s), as well as (at least) one UWB device/transmitter. The second device may include multiple UWB devices/transceivers, as well as a compass and accelerometer.

The first device may determine its azimuth and elevation angle (e.g., using the compass and accelerometer of the first device) with respect to a reference plane of the first device. As the first device moves, the azimuth and elevation angle correspondingly move. The second device may determine the first device's AoA with respect to the second device, based on UWB measurements obtained using the multiple UWB devices on the second device with respect to the UWB beacons from the UWB device of the first device. Additionally, and similar to the first device, the second device may determine its azimuth and elevation angle with respect to a reference plane of the second device. The second device may generate and transmit a measurement report to the first device, which enables the first device to compute or determine an AoA of the second device with respect to the first device. As such, rather than requiring the first device to include multiple UWB devices to measure the AoA (azimuth and elevation AoA) of the second device, the first device may leverage the measurement report received from the second device to measure the azimuth and elevation AoA of the second device.

In some embodiments, the second device may generate the measurement report to include an azimuth and elevation from the first device with respect to an azimuth reference plane of the second device, and an angle between true north and the horizon with respect to an elevation reference plane of the second device. In such embodiments, the measurement report may include four values, e.g., 1) an azimuth from the first device with respect to an azimuth reference plane of the second device $\theta_{B\_AoA}$, 2) an elevation from the first device with respect to an elevation reference plane $\phi_{B\_AoA}$, and 3) a delta of the azimuth reference plane to true north $\theta_{B\_REF}$, and 4) a delta of the elevation reference plane to the horizon $\phi_{B\_REF}$. In some embodiments, the second device may use the four values described above to calculate azimuth and elevation angles between the first device and true north/the horizon (rather than offloading that computation to the first device). In such embodiments, the measurement report may include two values (e.g., an azimuth angle from the first device with respect to true north [e.g., $(\theta_{B\_AoA}+\theta_{B\_REF})$ mod $2\pi$] and an elevation angle of the first device with respect to the horizon [e.g., $(\phi_{B\_AoA}+\phi_{B\_REF})$ mod $2\pi$]). In both cases, the second device may generate a fixed bit-width string including the quantized values, and format the string to generate a measurement report for transmitting to the first device. The measurement report may be shared with the first device via a UWB physical (PHY) frame, or an out of band message or PHY frame (such as via Wi-Fi, BLE, etc.).

The first device may receive the measurement report from the second device, and use the values from the measurement report to compute or calculate an AoA of the second device with respect to the first device and/or with respect to the reference plane of the first device. For example, the first device may calculate the AoA of the second device with respect to true north and the horizon using the equations described above (if those values where not already calculated by the second device and provided in the measurement report). The first device may also calculate an AoA of the second device with respect to reference planes of the first device (e.g., $\theta_{A\_REF}=(\theta_{A\_AOA}-\theta_{A\_North})$ mod $2\pi$, and $\phi_{A\_REF}=(\phi_{A\_AOA}-\phi_{A\_Horizon})$ mod $2\pi$).

In these embodiments, rather than requiring the first device (or both device) to include multiple UWB antennas (which can be costly from a production standpoint and/or from a physical space standpoint), the first device may leverage the measurement report for determining its own AoA with respect to the second device.

In one aspect, this disclosure is directed to a method. The method includes receiving, by a first device having at least one ultra-wideband (UWB) device, from a second device having a plurality of UWB devices, a report including a plurality of values comprising an elevation component of an angle of approach (AoA) from the first device and an azimuth component of the AoA from the first device. At least some of the plurality of values may be obtained according to measurements between the plurality of UWB devices of the second devices and the at least one UWB device of the first device. The method includes determining, by the first device, an AoA from the second device, using the plurality of values from the report received from the second device.

In some embodiments, the method further includes determining, by the first device using one or more sensors of the first device, an elevation of the first device with respect to a first reference, and an azimuth of the first device with respect to a second reference. The method may further include determining, by the first device, the AoA from the second device with respect to the first reference and the second reference, according to the elevation and the azimuth of the first device. In some embodiments, the at least one UWB device is a single UWB device. In some embodiments, the elevation component of the AoA from the first device is with respect to an elevation reference plane of the second device, and the azimuth component of the AoA from the first device is with respect to an azimuth reference plane of the second device.

In some embodiments, the plurality of values further include a first angle between the elevation reference plane of the second device and true horizon, and a second angle between the azimuth reference plane of the second device and true north. In some embodiments, the elevation component of the AoA from the first device is with respect to true horizon, and wherein the azimuth component of the AoA from the first device is with respect to true north. In some embodiments, the report is included in a data packet sent using at least one of a UWB-based protocol, Bluetooth-based protocol, wireless local area network (LAN)-based protocol, near field communication (NFC)-based protocol, or cellular-based protocol. In some embodiments, the at least one UWB device comprises a plurality of UWB devices. Determining, by the first device, the AoA from the second device may include determining the AoA from the second device, according to measurements obtained between the plurality of UWB devices of the second device and the plurality of UWB devices of the first device, and the plurality of values from the report received from the second device. In some embodiments, the report is a first report, and the method further includes receiving a second report from the second device subsequent to the first report, and determining a trajectory of the second device according to the first report and the second report.

In another aspect, this disclosure is directed to a first device. The first device includes at least one ultra-wideband (UWB) device. The first device includes one or more processors configured to receive, from a second device having a plurality of UWB devices, a report including a plurality of values including an elevation component of an angle of approach (AoA) from the first device and an azimuth component of the AoA from the first device. At least some of the plurality of values may be obtained according to measurements between the plurality of UWB devices of the second devices and the at least one UWB device of the first device. The one or more processors are configured to determine an AoA from the second device, using the plurality of values from the report received from the second device.

In some embodiments, the first device includes one or more sensors communicably coupled to the one or more processors. The one or more processors may be further configured to determine, using the one or more sensors of the first device, an elevation of the first device with respect to a first reference, and an azimuth of the first device with respect to a second reference. The one or more processors may be further configured to determine the AoA from the second device with respect to the first reference and the second reference, according to the elevation and the azimuth of the first device. In some embodiments, the at least one UWB device is a single UWB device.

In some embodiments, the elevation component of the AoA from the first device is with respect to an elevation reference plane of the second device, and the azimuth component of the AoA from the first device is with respect to an azimuth reference plane of the second device. In some embodiments, the plurality of values further include a first angle between the elevation reference plane of the second device and true horizon, and a second angle between the azimuth reference plane of the second device and true north. In some embodiments, the elevation component of the AoA from the first device is with respect to true horizon, and the azimuth component of the AoA from the first device is with respect to true north. In some embodiments, the report is included in a data packet sent using at least one of a UWB-based protocol, Bluetooth-based protocol, wireless local area network (LAN)-based protocol, near field communication (NFC)-based protocol, or cellular-based protocol. In some embodiments, the at least one UWB device comprises a plurality of UWB devices. Determining the AoA from the second device may include determining the AoA from the second device according to measurements obtained between the plurality of UWB devices of the second device and the plurality of UWB devices of the first device, and the plurality of values from the report received from the second device. In some embodiments, the report is a first report, and the one or more processors are further configured to receive a second report from the second device subsequent to the first report, and determine a trajectory of the second device according to the first report and the second report.

In yet another aspect, this disclosure is directed to a non-transitory computer readable medium storing instructions that, when executed by one or more processors, cause the one or more processors in a first device to receive, from a second device having a plurality of UWB devices, a report including a plurality of values comprising an elevation component of an angle of approach (AoA) from a first device and an azimuth component of the AoA from the first device. At least some of the plurality of values obtained according to measurements between the plurality of UWB devices of the second devices and the at least one UWB device of the first device. The instructions further cause the one or more processors to determine an AoA from the second device, using the plurality of values from the report received from the second device.

In some embodiments, the instructions further cause the one or more processors to determine, using data from one or more sensors of the first device, an elevation of the first device with respect to a first reference, and an azimuth of the first device with respect to a second reference, and determine the AoA from the second device with respect to the first reference and the second reference, according to the elevation and the azimuth of the first device.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are embodiments related to determining an Angle of Approach (AoA) using measurement reports shared between two devices. Using the systems and methods described herein, a first device (which may have more simplified hardware) may leverage a measurement report received from a second device to calculate the AoA of the first device with respect to the second device. The first device may include a compass and/or accelerometer(s), as well as (at least) one UWB device/transmitter. The second device may include multiple UWB devices/transceivers, as well as a compass and/or accelerometer. The first device may receive a measurement report from the second device, and use the values from the measurement report to compute or calculate an AoA of the second device with respect to the first device and/or with respect to the reference plane of the first device. For example, the first device may calculate the AoA of the second device with respect to true north and the horizon. The first device may also calculate an AoA of the second device with respect to reference planes of the first device. In these embodiments, rather than requiring the first device (or both device) to include multiple UWB antennas (which can be costly from a production standpoint and/or from a physical space standpoint), the first device may leverage the measurement report for determining its own AoA with respect to the second device.

Figure 1:
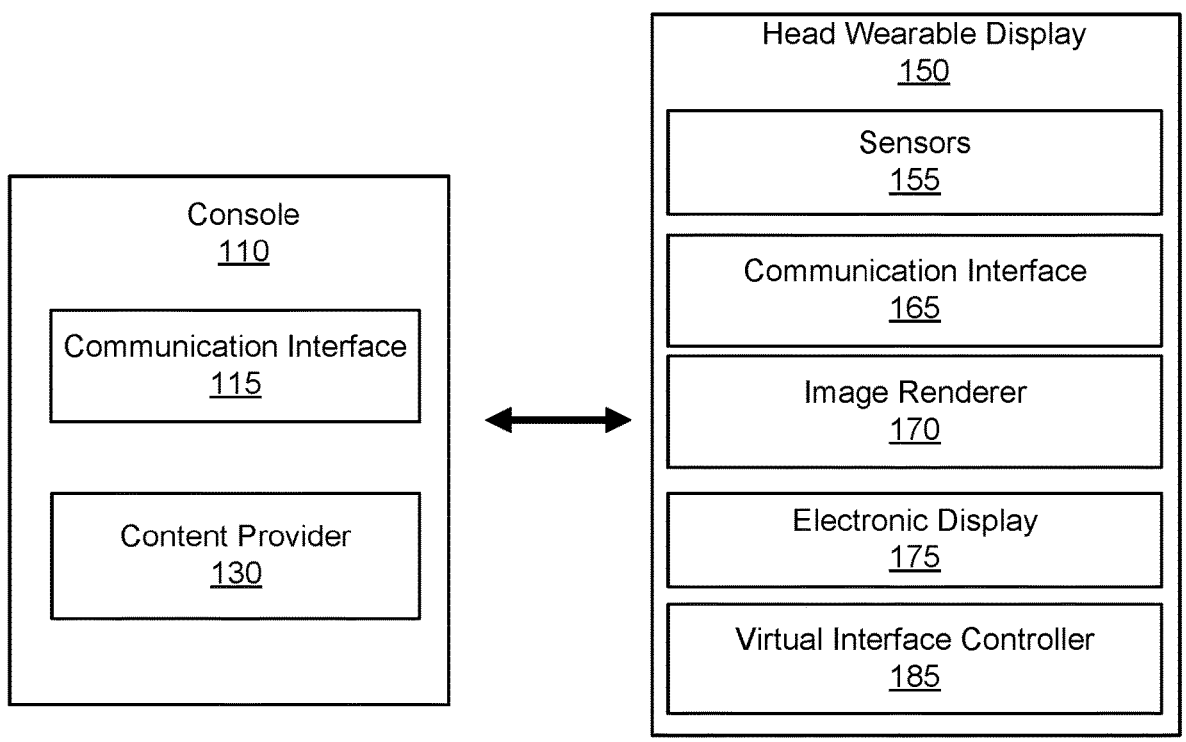
FIG. 1 is a diagram of a system environment including an artificial reality system, according to an example implementation of the present disclosure.

FIG. 1 is a block diagram of an example artificial reality system environment 100 in which a console 110 operates. In some embodiments, the artificial reality system environment 100 includes a HWD 150 worn by a user, and a console 110 providing content of an artificial reality to the HWD 150. The HWD 150 may be referred to as, include, or be part of a head mounted display (HMD), head mounted device (HMD), head wearable device (HWD), head worn display (HWD) or head worn device (HWD). In one aspect, the HWD 150 may detect its location and an orientation of the HWD 150 and/or a gaze direction of the user wearing the HWD 150, and can provide the detected location and orientation of the HWD 150 and/or the gaze direction to the console 110. The console 110 may determine a view within the space of the artificial reality corresponding to the detected location and orientation and/or the gaze direction, and generate an image depicting the determined view. The console 110 may provide the image to HWD 150 for rendering. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 includes or corresponds to an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, a communication interface 165, an image renderer 170, an electronic display 175, and/or a virtual interface controller 185. These components may operate together to detect a location and an orientation of the HWD 150 and/or a gaze direction of the user wearing the HWD 150, and can render an image of a view within the artificial reality corresponding to the detected location and orientation of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location, an orientation of the HWD 150, and/or a gaze direction of the user. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the imaging sensors can capture an image for detecting a physical object, a user gesture, a shape of the hand, a user interaction, etc. In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction. In one aspect, according to the location and the orientation of the HWD 150, a gaze direction of the user can be determined or estimated.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a universal serial bus (USB), Ethernet, Firewire, high-definition multimedia interface (HDMI), or any wired communication link.

In the embodiments, in which the console 110 and the head mounted display 150 are implemented on a single system, the communication interface 165 may communicate with the console 110 through at least a bus connection or a conductive trace. Through the communication link, the communication interface 165 may transmit to the console 110 data indicating the determined location of the HWD 150 and the orientation of the HWD 150 and/or the gaze direction of the user. Moreover, through the communication link, the communication interface 165 may receive from the console 110 data indicating image to be rendered.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and render the image through the electronic display 175. In some embodiments, the data from the console 110 may be compressed or encoded, and the image renderer 170 may decompress or decode the data to generate and render the image. In one aspect, the image renderer 170 receives the compressed image from the console 110, and decompresses the compressed image, such that a communication bandwidth between the console 110 and the HWD 150 can be reduced. In one aspect, the process of detecting, by the HWD 150, the location of the HWD 150, the orientation of the HWD and/or the gaze direction of the user wearing the HWD 150, and generating and transmitting, by the console 110, a high resolution image (e.g., 1920 by 1080 pixels) corresponding to the detected location, the orientation, and/or the gaze direction to the HWD 150 may be computationally exhaustive and may not be performed within a frame time (e.g., less than 11 ms). In one aspect, the image renderer 170 generates one or more images through a shading process and a reprojection process when an image from the console 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the virtual interface controller 185 is a component that generates a virtual interface based on a physical object. In one approach, the virtual interface controller 185 allows a user to utilize a physical object or a tangible object to control or modify a virtual reality or augmented reality application. In one approach, the virtual interface controller 185 detects a user gesture or a shape of a hand of the user associated with a physical object, and generates an interactive feature for the physical object in the virtual reality or augmented reality application according to the detected user gesture or the detected shape of the hand. In one example, an interactive feature is a virtual button or other object (e.g., a user interface element) overlaid on the physical object. In another example, an interactive feature includes or is related to an interaction of the user using a particular part of the physical object, such as a user pulling a trigger of a sprayer. The virtual interface controller 185 may detect a user interaction with the interactive feature, and initiate an action in the virtual reality or augmented reality application, in response to detecting the user interaction with the interactive feature. For example, a setting of the virtual reality or augmented reality application can be adjusted, or an input can be applied to the virtual reality or augmented reality application, according to the detected user interaction with the interactive feature. Advantageously, the user can control the virtual reality or augmented reality application without dedicated hardware or an electronic input device. Detailed descriptions on the examples of generating a virtual interface and operating the virtual reality or augmented reality application through the virtual interface are provided below with respect to FIGS. 3 through 8.

In some embodiments, the console 110 is an electronic component or a combination of an electronic component and a software component that provides content to be rendered through the HWD 150. In one aspect, the console 110 includes a communication interface 115 and a content provider 130. These components may operate together to determine a view of the artificial reality corresponding to the location of the HWD 150, the orientation of the HWD 150, and/or the gaze direction of the user of the HWD 150, and can generate an image of the artificial reality corresponding to the determined view. In other embodiments, the console 110 includes more, fewer, or different components than shown in FIG. 1. In some embodiments, the console 110 is integrated as part of the HWD 150 as a single device.

In some embodiments, the communication interface 115 is an electronic component or a combination of an electronic component and a software component that communicates with the HWD 150. The communication interface 115 may be a counterpart component to the communication interface 165 to communicate through a communication link (e.g., USB cable). Through the communication link, the communication interface 115 may receive from the HWD 150 data indicating the determined location of the HWD 150, the orientation of the HWD 150, and/or the determined gaze direction of the user. Moreover, through the communication link, the communication interface 115 may transmit to the HWD 150 data describing an image to be rendered.

The content provider 130 is a component that generates content to be rendered according to the location of the HWD 150, the orientation of the HWD 150, and/or the gaze direction of the user of the HWD 150. In one aspect, the content provider 130 determines a view of the artificial reality according to the location of the HWD 150, the orientation of the HWD 150, and/or the gaze direction of the user of the HWD 150. For example, the content provider 130 maps the location of the HWD 150 in a physical space to a location within a virtual space, and determines a view of the virtual space along a direction corresponding to the orientation of the HWD 150 and the gaze direction from the mapped location in the virtual space. The content provider 130 may generate image data describing an image of the determined view of the virtual space, and transmit the image data to the HWD 150 through the communication interface 115. In some embodiments, the content provider 130 generates metadata including motion vector information, depth information, edge information, object information, etc., associated with the image, and transmits the metadata with the image data to the HWD 150 through the communication interface 115. The content provider 130 may compress and/or encode the data describing the image, and can transmit the compressed and/or encoded data to the HWD 150. In some embodiments, the content provider 130 generates and provides the image to the HWD 150 periodically (e.g., every 11 ms).

Figure 2:
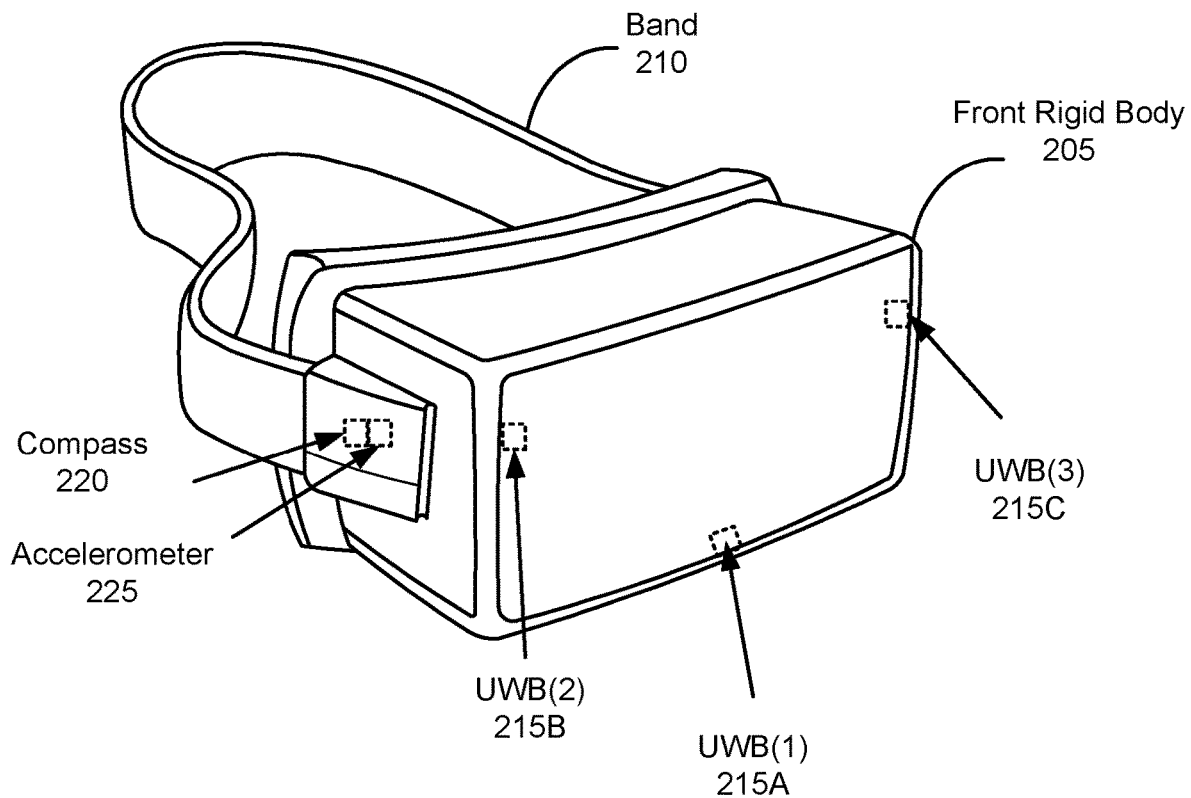
FIG. 2 is a diagram of a head wearable display, according to an example implementation of the present disclosure.

FIG. 2 is a diagram of the HWD 150, in accordance with an example embodiment. In some embodiments, the HWD 150 includes a front rigid body 205 and a band 210. The front rigid body 205 includes the electronic display 175 (not shown in FIG. 2), the sensors described above, and one or more UWB devices 215. In some embodiments, the sensors may include a compass 220 configured to detect a position or orientation of the HWD 150 relative to a direction or fixed location (such as true north). In some embodiments, the sensors may include an accelerometer 225 configured to detect motion and/or location. While described as a compass 220 and accelerometer 225, in some embodiments, the sensors may include other sensors or sensing systems, such as a gyroscope, a magnetometer, an inertial measurement unit (IMU), and so forth.

The UWB devices 215 may be configured to operate in the 3-10 GHz unlicensed spectrum using 500+ MHz channels which may require low power for transmission. As shown in FIG. 2, a set of UWB devices 215 may be spatially positioned/located (e.g., spaced out) relative to each other on different locations on/in the first device 150, so as to maximize UWB coverage and/or to enhance/enable specific functionalities. The UWB devices 215 may be or include antennas, sensors, or other devices and components designed or implemented to transmit and receive data or signals in the UWB spectrum (e.g., between 3.1 GHz and 10.6 GHz) and/or using UWB communication protocol. As described in greater detail below, the HWD 150 may be configured to determine an AoA of a device in an environment of the HWD 150 based on UWB signals received by the HWD 150 from the device.

Figure 3:
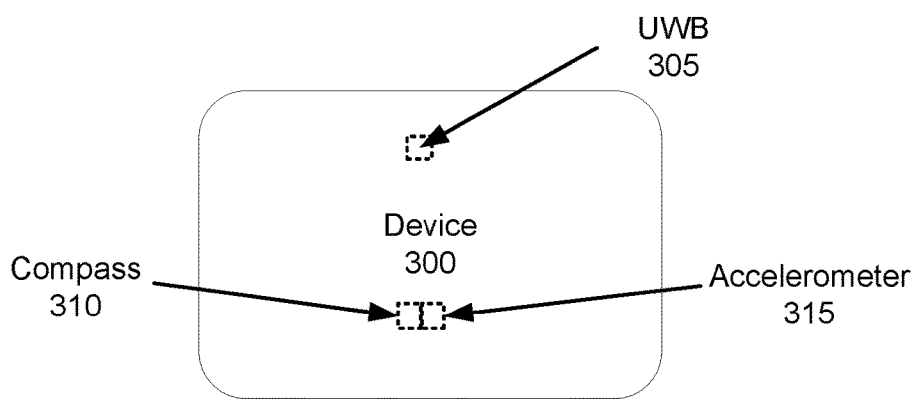
FIG. 3 is a diagram of a device, according to an example implementation of the present disclosure.

FIG. 3 is an example diagram of another device 300, according to an example implementation of the present disclosure. As shown in FIG. 3, the device 300 may include one or more sensors. The one or more sensors may include, for instance, a UWB device 305, a compass 310, and/or an accelerometer 315. The UWB device 305, compass 310, and accelerometer 315 may be similar to the UWB devices 215, compass 220, and accelerometer 225 described above with reference to FIG. 2. Additionally, and while shown as including a compass 310 and accelerometer 315, the device 300 may include additional or alternative sensors/sensing system which are configured to determine a position or location of the device 300, such as a gyroscope, a magnetometer, an inertial measurement unit (IMU), and so forth. In some embodiments, the device 300 may include a single UWB device 305. In some embodiments, and similar to the HWD 150, the device 300 may include a plurality of UWB devices 305.

As described in greater detail below, the device 300 may be configured to transmit, send, or otherwise provide UWB signals to the HWD 150. The HWD 150 may be configured to determine an AoA of the device 300 relative to the HWD 150. The HWD 150 may be configured to generate a report corresponding to the AoA of the device 300 for transmission to the device 300. The device 300 may determine, derive, or otherwise identify the AoA of the device 300 relative to the HWD 150 based on the report received from the HWD 150.

Figure 4:
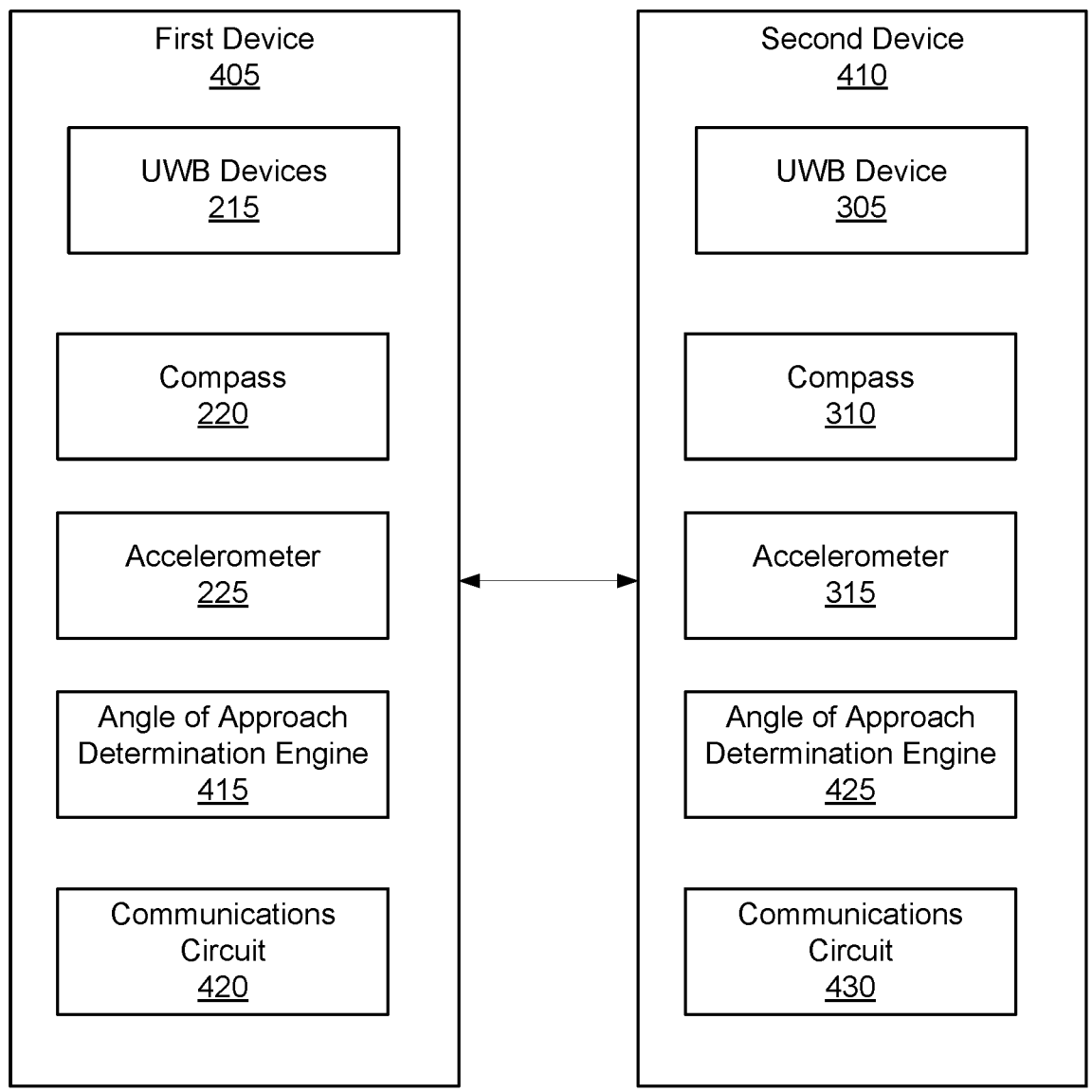
FIG. 4 is a block diagram of a system including a first and second device, according to an example implementation of the present disclosure.

Referring now to FIG. 4, depicted is a block diagram showing an environment 400 including a first device 405 and a second device 410. In some embodiments, the first device 405 may be or include a wearable device, such as the HWD 150 described above, a smart watch, AR glasses, or the like. In some embodiments, the first device 405 may include a mobile device (e.g., a smart phone, tablet, stage/console device, or other computing device). The first device 405 may be communicably coupled with various other second devices 410 located in the environment 400. For example, the first device 405 may be communicably coupled to one or more second devices 410 located in the environment 400. The second device 410 may be or include the computing device 110 described above, a device similar to the first device 450 (e.g., a HWD 150, a smart watch, mobile device, etc.), a smart home device (e.g., a smart television, a digital assistant device, a smart speaker, etc.), a smart tag configured for positioning on various devices, etc.

In some embodiments, the first device 405 may be communicably coupled with the second device(s) 410 following a pairing or handshaking process. For example, the first device 405 may be configured to exchange handshake packet(s) with the second device(s) 410, to pair (e.g., establish a specific or dedicated connection or link between) the first device 405 and the second device 410. The handshake packet(s) may be exchanged via the UWB devices 215, 305, or via another wireless link 125 (such as one or more of the wireless links 125 described above). Following pairing, the first device 405 and second device(s) 410 may be configured to transmit, receive, or otherwise exchange UWB data or UWB signals using the respective UWB devices 215, 305 on the first device 405 and/or second device 410. In some embodiments, the first device 405 may be configured to establish a communications link with a second device 410 (e.g., without any device pairing). For example, the first device 405 may be configured to detect, monitor, and/or identify second devices 410 located in the environment using UWB signals received from the second devices 410 within a certain distance of the first device 405, by identifying second devices 410 which are connected to a shared Wi-Fi network (e.g., the same Wi-Fi network to which the first device 405 is connected), etc. In these and other embodiments, the first device 405 may be configured to transmit, send, receive, or otherwise exchange UWB data or signals with the second device 410.

Figure 5:
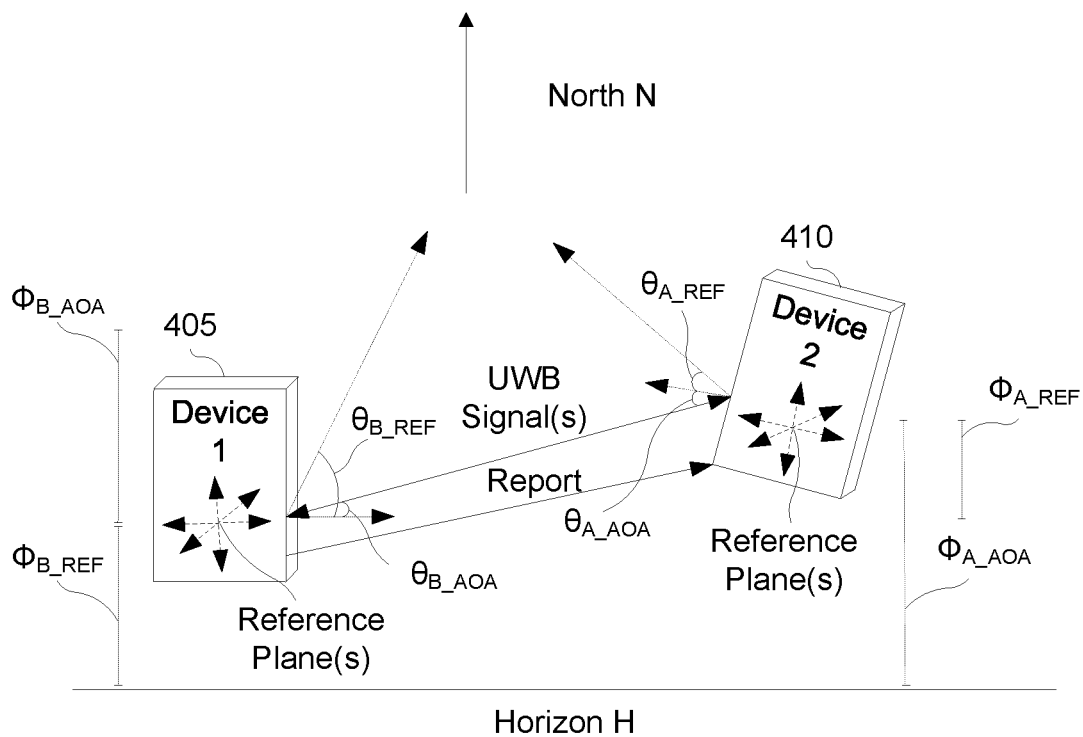
FIG. 5 is a diagram of a system for ultra-wideband-based angle of approach determination, according to an example implementation of the present disclosure.

Referring now to FIG. 4 and FIG. 5, the first device 405 may be configured to determine an angle of approach (AoA) of the second device 410. Specifically, FIG. 5 shows an environment 500 including a first device 405 and a second device 410. The first device 405 may be configured to send, broadcast, or otherwise transmit a UWB signal (e.g., a challenge signal). The first device 405 may transmit the UWB signal using one of the UWB devices 215 of the first device 405. The UWB device 215 may transmit the UWB signal in the UWB spectrum. The UWB signal may have a high bandwidth (e.g., 500 MHz). As such, the UWB device 215 may be configured to transmit the UWB signal in the UWB spectrum (e.g., between 3.1 GHz and 10.6 GHz) and having a high bandwidth (e.g., 500 MHz). The UWB signal from the first device 405 may be detectable by other devices within a certain range of the first device 405 (e.g., devices having a line of sight (LOS) within 200 m of the first device 405). As such, the UWB signal may be more accurate for detecting range between devices than other types of signals or ranging technology.

The second device 410 may be configured to receive or otherwise detect the UWB signal from the first device 405. The second device 410 may be configured to receive the UWB signal from the first device 405 via one of the UWB devices 305 on the second device 410. The second device 410 may be configured to broadcast, send, or otherwise transmit a UWB response signal responsive to detecting the UWB signal from the first device 405. The second device 410 may be configured to transmit the UWB response signal using one of the UWB devices 305 of the second device 410. The UWB response signal may be similar to the UWB signal sent from the first device 405.

The first device 405 may be configured to detect, compute, calculate, or otherwise determine a time of flight (TOF) based on the UWB signal and the UWB response signal. The TOF may be a time or duration between a time in which a signal (e.g., the UWB signal) is transmitted by the first device 405 and a time in which the signal is received by the second device 410. The first device 405 and/or the second device 410 may be configured to determine the TOF based on timestamps corresponding to the UWB signal. For example, the first device 405 and/or second device 410 may be configured to exchange transmit and receive timestamps based on when the first device 405 transmits the UWB signal (a first TX timestamp), when the peripheral device receives the UWB signal (e.g., a first RX timestamp), when the peripheral device sends the UWB response signal (e.g., a second TX timestamp), and when the first device 405 receives the UWB response signal (e.g., a second RX timestamp). The first device 405 and/or the second device 410 may be configured to determine the TOF based on a first time in which the first device 405 sent the UWB signal and a second time in which the first device 405 received the UWB response signal (e.g., from the second device 410), as indicated by first and second TX and RX timestamps identified above. The first device 405 may be configured to determine or calculate the TOF between the first device 405 and the second device 410 based on a difference between the first time and the second time (e.g., divided by two).

In some embodiments, the first device 405 may be configured to determine the range (or distance) between the first device 405 and the second device 410 based on the TOF. For example, the first device 405 may be configured to compute the range or distance between the first device 405 and the second device 410 by multiplying the TOF and the speed of light (e.g., TOF×c). The first device 405 may be configured to determine the range or distance between the second device 410 and each of the UWB devices 215 of the first device 405. As described in greater detail below, the first device 405 may be configured to use the range or distance between the second device 410 and the UWB devices 215 of the first device to determine an AoA of the second device 410.

In some embodiments, the first device 405 may be configured to determine an AoA of the first device 405 relative to the second device 410. The first device 405 and/or the second device 410 may be configured to determine the relative position or orientation in a manner similar to determining the range as described above. For example, the first device 405 and/or the second device 410 may be configured to determine a plurality of ranges (e.g., range(1), range(2), and range(3)) between each of the UWB devices 215 of the first device 405 and the UWB device 305 of the second device 410. In the environment 500 of FIG. 5, the second device 410 is positioned or oriented at an angle and at an elevation relative to the second device 405. The first device 405 may be configured to compute ranges between the UWB device 305 of the second device 410 and the UWB devices 215 of the first device 405. The ranges may be an absolute range or distance between the devices 405, 410, and may be computed as described above with respect to FIG. 4. While described above as determining a range based on additional UWB signals, it is noted that, in some embodiments, the first device 405 may be configured to determine a phase difference between a UWB signal received from the second device 410 at a first UWB device 215 and a second UWB device 215 of the first device 405 (e.g., the same UWB signal received at separate UWB devices 215 on the same device 405). The first device 405 and/or the second device 410 may be configured to use each or a subset of the computed ranges (or phase differences) to determine the AoA of the second device 410 relative to the first device 405.

The first device 405 and the second device 405 are shown to include an AoA determination engine 415, 425. The AoA determination engine 415, 425 may be or include any device, component, processor, system, circuit, or hardware designed or implemented to determine an AoA of a device relative to another device. The AoA determination engine 415, 425 may be configured to receive data from the UWB devices 215, 305 to determine the AoA of another device. For example, the AoA determination engine 415 may be configured to receive data from the UWB devices 215 for determining an AoA of the second device 410 relative to the first device 405. As described in greater detail below, the AoA determination engine 415 may be configured to determine an azimuth AoA and an elevation AoA of the second device 410 relative to the first device 405. The azimuth AoA and the elevation AoA may together define an angle or direction of the second device 410 relative to the first device 405. The azimuth AoA may be or include a horizontal angle between the first device 405 and the second device 410. The elevation AoA may be or include a vertical angle/distance between the first device 405 and the second device 410. As such, a combination of the horizontal angle and the vertical angle/distance between the first and second devices 405, 410 may represent a position, pose, or orientation of the second device 410 relative to the first device 405.

The AoA determination engine 415 may be configured to determine an azimuth AoA $\theta_{B\_AoA}$ from the second device 410 using the UWB response signals received from the second device 410. In some embodiments, the AoA determination engine 415 may be configured to determine an azimuth AoA $\theta_{B\_AoA}$ based on a phase difference between a UWB response signal received from the second device 410 at the second UWB device 215B and third UWB device 215C. In some embodiments, the AoA determination engine 415 may be configured to determine an azimuth AoA $\theta_{B\_AoA}$ based on a difference in range between a first UWB response signal received at the second UWB device 215B from the UWB device 305 of the device 300 and a second UWB response signal received at the third UWB device 215C from the UWB device 305 of the device.

The AoA determination engine 415 may be configured to determine an elevation AoA $\Phi_{B\_AOA}$ from the second device 410 using the UWB response signals received from the second device 410. In some embodiments, the AoA determination engine 415 may be configured to determine an elevation AoA $\Phi_{B\_AoA}$ based on a phase difference between a UWB response signal received from the second device 410 at the first UWB device 215A and third UWB device 215C. In some embodiments, the AoA determination engine 415 may be configured to determine an elevation AoA $\Phi_{B\_AoA}$ based on a difference in range between a first UWB response signal received at the first UWB device 215A from the UWB device 305 of the device 300 and a second UWB response signal received at the second UWB device 215B from the UWB device 305 of the device.

The first device 405 may be configured to determine a local position or orientation of the first device 405 relative to one or more global coordinates. The first device 405 may be configured to determine a local elevation $\Phi_{B\_REF}$ or altitude relative to the Horizon H. The Horizon H, as referred to herein, means a distance or elevation between a device and a surface on Earth. In some embodiments, the Horizon H may be a distance or elevation between the first device 405 and sea level (e.g., an altitude or True Horizon). In some embodiments, the Horizon H may be a distance or elevation between the first device 405 and ground level (e.g., at a geolocation of the first device 405 including current altitude or elevation from sea level). The first device 405 may be configured to maintain a global axis or plane relative to the Horizon H using data from the accelerometer 225 (for example, Z-axis acceleration data from the accelerometer).

The first device 405 may be configured to determine a local orientation or position of the first device 405 relative to North N. The local axis or plane of the first device 405 relative to the North N may be a relative or local azimuth $\theta_{B\_REF}$ of the first device 405. North N, as referred to herein, means a direction of a device relative to an axis of Earth. The first device 405 may be configured to maintain a local orientation or position of the first device 405 relative to North N using data from the compass 220. The compass 220 may measure or quantify a direction to Earth's magnetic axis (e.g., Magnetic North). The compass 220 may measure or quantify a direction to Earth's northern-most point along Earth's axis (e.g., True North).

As shown in FIG. 5, the first device 405 may be configured to maintain or determine one or more reference planes. The reference planes may be/include planes and/or axes defined at a known or fixed location of the first device 405. For example, the reference planes may be defined at a surface of the first device 405, at a center of mass of the first device 405, and so forth. The reference planes may include an azimuth reference plane and an elevation reference plane. The azimuth reference plane may be used for determining an angle of the first device 405 relative to North N. Similarly, the elevation reference plane may be used for determining an angle or elevation of the first device 405 with respect to the Horizon H. As the first device 405 moves about an environment, the reference planes may remain fixed. On the other hand, the angle of the first device 405 relative to North N and angle or elevation of the first device 405 with respect to the Horizon may be change as the first device 405 moves about the environment. The second device 410 may be configured to maintain or determine reference planes similar to the first device 405. The first and second device 405, 410 may be configured to use the reference planes for determining an AoA between the devices 405, 410 with respect to reference planes and North N/the Horizon H.

The first device 405 and second device 410 are shown to include a communications circuit 420, 430. The communications circuit 420, 430 may include any device, component, processor, system, circuit, or hardware designed or implemented to transmit or receive data. In some embodiments, the communications circuit 420, 430 may include one or more antennas. For example, the communications circuit 420, 430 may include a Bluetooth antenna, a Wi-Fi or other wireless local area network (LAN)-based antenna, one or more cellular antennas, a near-field communication (NFC) antenna, and so forth. The communications circuit 420 may be configured to establish a connection with the communications circuit 430. For example, and as described above, the communications circuit 420 of the first device 405 may be configured to establish a connection with the communications circuit 430 of the second device 410 responsive to a handshake or pairing protocol between the devices 405, 410. The handshake or pairing protocol may be initiated at the first device 405 and/or the second device 410.

The AoA determination engine 415 may be configured to generate, determine, derive, or otherwise compute a report (also referred to herein as a measurement report). The report may be or include a data packet, data string, or the like. The report may include one or more fields. In some embodiments, the one or more fields may include the azimuth AoA $\theta_{B\_AoA}$ from the second device 410, the elevation AoA $\Phi_{B\_AOA}$ from the second device 410, the local azimuth angle $\theta_{B\_REF}$ of the first device 405 (e.g., with respect to the azimuth reference plane), and the local elevation angle $\Phi_{B\_REF}$ of the first device 405 (e.g., with respect to the elevation reference plane). The AoA determination engine 415 may be configured to populate the fields of the report with one or more values relating to the AoA of the second device 410 relative to the first device 405 determined as described above. In some embodiments, the one or more fields may include an azimuth AoA of the first device 405 from the second device 410 with respect to North N. The AoA determination engine 415 may be configured to determine, derive, or otherwise compute the azimuth AoA of the first device 405 from the second device 410 with respect to North N using the azimuth AoA $\theta_{B\_AoA}$ and the local azimuth angle $\theta_{B\_REF}$. For example, the AoA determination engine 415 may be configured to compute the azimuth AoA of the first device 405 from the second device 410 with respect to North N according to $[(\theta_{B\_AOA}+\theta_{B\_REF})\bmod 2\pi]$. The AoA determination engine 415 may be configured to determine, derive, or otherwise compute an elevation AoA of the first device 405 from the second device 410 with respect to the Horizon H using the elevation AoA $\Phi_{B\_AOA}$ and the local elevation $\Phi_{B\_REF}$. For example, the AoA determination engine 415 may be configured to compute the elevation AoA of the first device 405 from the second device 410 with respect to the Horizon H according to $[(\Phi_{B\_AOA}+\Phi_{B\_REF})\bmod 2\pi]$.

In some embodiments, the values included in the report may be or include a fixed bit-width defining the values for the field. The AoA determination engine 415 may be configured to round, truncate, etc., any additional bits for the computed/determined values. The report may include a predefined, preformatted, and/or predetermined format which may be parsed by the second device 410 as described in greater detail below.

The first device 405 may be configured to transmit, provide, share, or otherwise send the report to the second device 410. In some embodiments, the first device 405 may be configured to send the report to the second device 410 via one of the devices of the communications circuit 420. For example, the first device 405 may be configured to send the report to the second device 410 via the Bluetooth antenna of the communications circuit 420, via the wireless LAN antenna of the communications circuit 420, via the NFC antenna of the communications circuit 420, via the cellular antenna(s) of the communications circuit 420, and so forth. In other words, the first device 405 may be configured to send the report to the second device 410 via a Bluetooth-based protocol, wireless local area network (LAN)-based protocol, near field communication (NFC)-based protocol, or cellular-based protocol. In some embodiments, the first device 405 may be configured to send the report to the second device 410 using at least one of the UWB devices 215 of the first device 405. For example, the first device 405 may be configured to send the report in a UWB physical (PHY) packet using one of the UWB devices 215 of the first device 405. As such, the first device 405 may be configured to send the report to the second device via a UWB-based protocol.

The second device 410 may be configured to receive the report from the first device 405. The second device 410 may be configured to receive the report via one of the antennas of the communications circuit 430, via the UWB device(s) 305 of the second device 410, and so forth. The second device 410 may be configured to determine an AoA of the second device 410 from the first device 405 using the values from the report received from the first device 405. Since, in some implementations, the second device 410 includes a single UWB device 305, the second device 410 may not be capable or configured to determine the AoA of the second device 410 from the first device 405 based solely on UWB signals received from the first device 405. As such, the second device 410 may use the values from the report to determine the AoA of the second device 410 from the first device 405.

The second device 410 may be configured to calculate, compute, derive, or otherwise determine the AoA from the first device 405 with respect to North N and the Horizon H. In some instances, the second device 410 may be configured to determine the AoA from the first device 405 with respect to North N and the Horizon H based solely on values from the report received from the first device 405 (e.g., without any sensor measurements obtained by the second device 410). In some embodiments, the second device 410 may be configured to compute an azimuth AoA of the second device 410 relative to North (e.g., a true azimuth AoA $\theta_{A\_AoA}$). The second device 410 may be configured to compute the true azimuth AoA $\theta_{A\_AOA}$ based on or according to $\theta_{A\_AOA} = (\pi + \theta_{B\_AOA} + \theta_{B\_REF})$ mod $2\lambda$. In some embodiments, the second device 410 may be configured to compute an elevation AoA of the second device 410 relative to the Horizon H (e.g., a true elevation AoA $\Phi_{A\_AOA}$). The second device 410 may be configured to compute the true elevation AoA $\Phi_{A\_AOA}$ based on or according to $\phi_{A\_AOA} = (\pi + \phi_{B\_AOA} + \phi_{B\_REF})$ mod $2\pi$. The true azimuth AoA $\theta_{A\_AOA}$ and the true elevation AoA $\Phi_{A\_AOA}$ may together define an AoA of the second device 410 relative to the first device 405 with respect to one or more global coordinates, surfaces, axes, and/or planes.

In some implementations, the second device 410 may not include a compass 310 and/or accelerometer 315. As such, the second device 410 may not be capable of calculating a complete AoA of the second device 410 because the second device 410 is unaware of reference plane angles of the second device 410. However, the second device 410 may still use the reports for additional purposes or uses. For example, the second device 410 may be located or positioned in a fixed or known location. The second device may use the true azimuth AoA $\theta_{A\_AOA}$ and the true elevation AoA $\Phi_{A\_AOA}$ to calculate a trajectory of the first device 405 based on changes in successive reports from the first device 405. For example, the first device 405 may send a first report to the second device 410 at a first time instance and a second report to the second device 410 at a second time instance. The second device 410 may be configured to determine the true azimuth AoA $\theta_{A\_AOA}$ and the true elevation AoA $\Phi_{A\_AOA}$ of the second device 410 relative to the first device 405 at the first time instance and the true azimuth AoA $\theta_{A\_AOA}$ and the true elevation AoA $\Phi_{A\_AOA}$ of the second device 410 relative to the first device 405 at the second time instance. The second device 410 may be configured to determine a trajectory of the first device 405 relative to the second device 410 based on a change in the true azimuth AoA $\theta_{A\_AOA}$ and the true elevation AoA $\Phi_{A\_AOA}$ in the first and second time instances. Additionally, where both the first and second device 405, 410 do not include the compass 220, 310 and accelerometer 225, 315, the first and second devices 405, 410 may determine the AoA of the devices 405, 410 with respect to the world planes (e.g., North N and the Horizon H). In some instances, such as where both the first and second device 405, 410 do not include the compass 220, 310 and accelerometer 225, 315, the first and second devices 405, 410 may be configured to periodically share reports to determine or calculate a relative trajectory of the two devices 405, 410. The relative trajectory may be use for body tracking, gesture-based controls, motion classification (e.g., approaching or retracting), and so forth.

As described above, in some embodiments, the second device 410 may include a compass 310 and/or accelerometer 315. Similar to the compass 220 and accelerometer 225, the compass 310 and/or accelerometer 315 of the second device 410 may be configured to measure a local elevation or altitude of the second device 410 (relative to the Horizon H) and a local azimuth of the second device 410 (relative to North N). The second device 410 may be configured to use data from the compass 310 and accelerometers 315 to determine or define one or more reference planes of the second device 410 (e.g., a reference plane from the second device 410 to North N and a reference plane from the second device 410 to the Horizon H). The second device 410 may be configured to compute a local azimuth AoA $\theta_{A\_REF}$ relative to an orientation of the second device 410 with respect to North (e.g., based on data from the compass 310). The second device 210 may be configured to compute the local azimuth AoA $\theta_{A\_REF}$ based on or according to $\theta_{A\_REF} = (\theta_{A\_AOA} - \theta_{A\_North})$ mod $2\pi$. The second device 410 may be configured to compute a local elevation AoA $\Phi_{A\_REF}$ relative to an orientation of the second device 410 with respect to the Horizon H (e.g., based on data from the accelerometer 315). The second device 410 may be configured to compute the local elevation AoA $\Phi_{A\_REF}$ based on or according to $\phi_{B\_REF} = (\phi_{A\_AOA} - \phi_{A\_Horizon})$ mod $2\pi$. The local azimuth AoA $\theta_{A\_REF}$ and local elevation AoA $\theta_{A\_REF}$ may together define an AoA of the second device 410 relative to the first device 504 with respect to various planes or coordinates of the second device 410.

In some instances, the first device 405 and the second device 410 may both include a plurality of UWB devices 215, 305. For example, the second device 410 may include a plurality of UWB devices 305 arranged at various locations or positions on the second device 410. The second device 410 may therefore be configured to determine an AoA of the first device 405 relative to the second device 405 in a manner similar to the first device 405 as described above. In some embodiments, the second device 405 may be configured to send a report to the first device 405. As such, both the first and second devices 405, 410 may be configured to determine an AoA using the UWB devices 215, 305 and generate reports for sending to the first and second devices 405, 410. The reports may be used for improving the accuracy of the overall AoA estimate and determination (for example, by combining or comparing AoA measurements obtained by the device 405, 410 and AoA measurements determined from the report from the other device 410, 405). Additionally, the reports may be used for power saving by the devices 405, 410 (e.g., by offloading determining the AoA to another device 410, 405 in the environment).

Figure 6A:
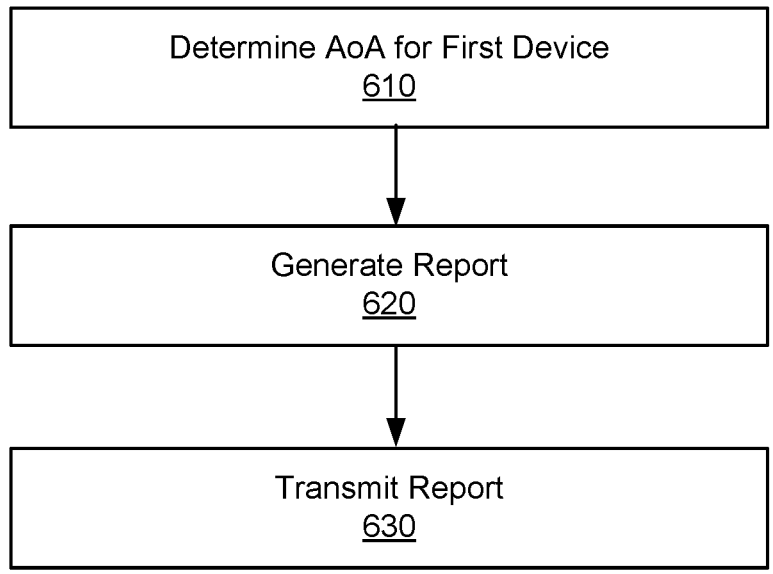
FIG. 6A is a flow chart showing a method for generating a report, according to an example implementation of the present disclosure.

Referring now to FIG. 6A, depicted is a flow chart showing a method 600 for generating a report, according to an example implementation of the present disclosure. The method 600 may be performed by one of the devices 405, 410 described above with reference to FIG. 4. For example, the method 600 may be performed by the first device 405. As a brief overview, at step 610, a first device determines an AoA for the first device. At step 620, the first device generates a report. At step 630, the first device transmits the report.

At step 610, a first device determines an AoA for the first device. In some embodiments, the first device may determine an azimuth AoA and an elevation AoA for the first device with respect to a second device. In some embodiments, the first device may determine the azimuth AoA and elevation AoA based on measurements obtained via UWB signals exchanged between the first device and the second device. For example, the first device may send a UWB signal to the second device. The second device may receive the UWB signal from the first device, and may send a UWB response signal back to the first device. The first device may receive the UWB response signal via the UWB devices of the first device. In some embodiments, the first device may determine an azimuth AoA for the first device relative to the second device based on a phase difference between the UWB response signal received at a first UWB device of the first device and a second UWB device of the first device. In some embodiments, the first device may determine an azimuth AoA for the first device relative to the second device based on a range difference between the UWB response signal received at a first UWB device of the first device and a second UWB device of the first device. In some embodiments, the first device may determine an elevation AoA for the first device relative to the second device based on a phase difference between the UWB response signal received at a first UWB device of the first device and a second UWB device of the first device. In some embodiments, the first device may determine the elevation AoA for the first device relative to the second device based on a range difference between the UWB response signal received at a first UWB device of the first device and a second UWB device of the first device.

The first device may determine a position or orientation of the first device relative to one or more global axes, coordinates, surfaces, reference planes, and the like. For example, the first device may determine a relative orientation of the first device relative to North N. Additionally or alternatively, the first device may determine a relative elevation of the first device with respect to the Horizon H. The first device may determine an angle between the first device (e.g., an elevation plane of the first device) and the Horizon H and an angle between an the first device (e.g., an azimuth plane of the first device) and North N. In some embodiments, the first device may determine the azimuth AoA and elevation AoA from the second device with respect to North and the Horizon.

At step 620, the first device generates a report. In some embodiments, the first device generates the report including values for the AoA determined at step 610. For example, the first device may generate the report including the azimuth AoA of the first device relative to the second device and the elevation AoA of the first device relative to the second device. In some embodiments, the first device may generate the report to include the azimuth AoA of the first device from the second device with respect to an azimuth reference plane of the first device, the elevation AoA of the first device from the second device with respect to an elevation reference plane of the first device, an angle between North and the azimuth reference plane of the first device, and an angle between the Horizon and the elevation reference plane of the first device. In some embodiments, the first device may generate the report to include an azimuth AoA of the first device from the second device with respect to North and an elevation AoA of the first device from the second device with respect to the Horizon.

At step 630, the first device transmits the report. In some embodiments, the first device transmits the report to a second device. The first device may transmit the report responsive to generating the report. In some embodiments, the first device may transmit the report responsive to receiving a request for a report from the second device. In some embodiments, the first device may transmit the report at various intervals (e.g., every second, every five seconds, every 10 seconds, etc.). In some embodiments, the first device may transmit the report responsive to detecting a change in motion (e.g., according to signals received from a compass and/or accelerometer of the first device). The first device may transmit the report via one or more protocols. For example, the first device may transmit the report using a UWB-based protocol, Bluetooth-based protocol, wireless local area network (LAN)-based protocol, near field communication (NFC)-based protocol, or cellular-based protocol. As such, the first device may transmit the report using the UWB device of the first device, via a Bluetooth antenna, a Wi-Fi or other wireless LAN-based antenna, an NFC antenna, a cellular antenna, etc., to the second device.

Figure 6B:
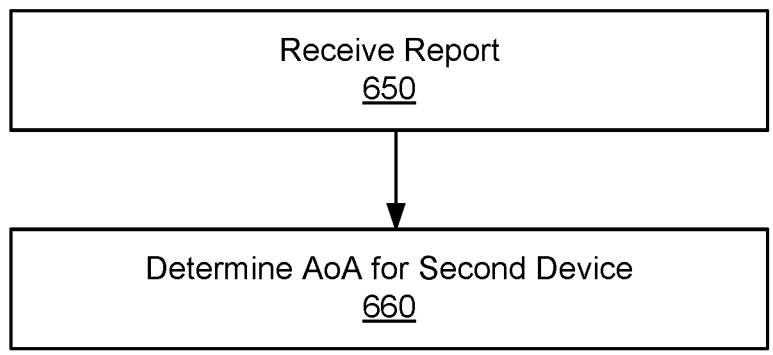
FIG. 6B is a flow chart showing a method of ultra-wideband-based angle of approach determination, according to an example implementation of the present disclosure.

Referring now to FIG. 6B, depicted is a flow chart showing a method 640 of ultra-wideband-based angle of approach determination, according to an example implementation of the present disclosure. The method 640 may be performed by one of the devices 405, 410 described above with reference to FIG. 4. For example, the method 640 may be performed by the second device 410. As a brief overview, at step 650, a second device receives a report. At step 660, the second device determines an AoA for the second device.

At step 650, a second device receives a report. In some embodiments, the second device may include at least one UWB device. The second device may receive a report from a second device having a plurality of UWB devices. The report may include a plurality of values including an elevation component of an AoA (e.g., an elevation AoA) from the second device and an azimuth component of the AoA (e.g., an azimuth AoA) from the second device. At least some of the plurality of values may be obtained according to measurements between the plurality of UWB devices of the first device and the at least one UWB device of the second device. In some embodiments, the elevation AoA may be an elevation AoA of the first device from the second device with respect to an elevation reference plane of the first device and the azimuth AoA may be an azimuth AoA of the first device from the second device with respect to an azimuth reference plane of the first device. In at least some of these embodiments, the report may also include an angle between the azimuth reference plane and North N and an angle between the elevation reference plane from the Horizon. The first device may generate the report as described above with reference to step 620 of FIG. 6A. The first device may transmit the report to the second device as described above with reference to step 630 of FIG. 6A. In some embodiments, the second device may include a single UWB device. In some embodiments, the second device may include a plurality of UWB devices.

At step 660, the second device determines an AoA for the second device. In some embodiments, the second device may determine an AoA from the first device using the plurality of values from the report received from the first device. In some embodiments, the second device may determine an elevation component of the AoA and an azimuth AoA component of the AoA from the first device. In some embodiments, the second device may determine the elevation component of the AoA and the azimuth component of the AoA from the first device with respect to the Horizon and North. In some embodiments, the second device may determine the elevation component of the AOA and the azimuth component of the AoA from the first device with respect to one or more reference planes of the second device.

In some embodiments, the second device may determine the elevation component of the AoA and the azimuth component of the AoA from the first device with respect to the Horizon and North. The second device may determine the azimuth component of the AoA based on the azimuth component of the AoA of the first device from the second device and an angle of the azimuth reference plane of the first device from North N received in the report. For example, the second device may determine the azimuth component of the AoA based on or according to $(\pi+\theta_{B\_AOA}+\theta_{B\_REF})$ mod $2\pi$, where $\theta_{B\_AOA}$ is the azimuth component of the AoA from the first device to the second device and $\theta_{B\_REF}$ is the angle of the azimuth reference plane from North. The second device may determine the horizon component of the AoA based on the horizon component of the AoA of the first device from the second device and an angle, distance, or elevation of the horizon reference plane of the first device from Horizon H received in the report. For example, the second device may determine the elevation component of the AoA based on or according to $(\pi+\phi_{B\_AOA}+\phi_{B\_REF})$ mod $2\pi$, where $\phi_{B\_AOA}$ is the elevation component of the AoA from the first device to the second device and $\phi_{B\_REF}$ is the angle, distance, or elevation of the elevation reference plane from the Horizon.

In some embodiments, the second device may determine the elevation component of the AOA and the azimuth component of the AoA from the first device with respect to one or more reference planes of the second device. For example, the second device may receive data from one or more sensors of the second device. The one or more sensors may include a compass and/or an accelerometer of the second device. The second device may determine an elevation of the second device with respect to a first reference and an azimuth of the second device with respect to a second reference. The first reference may be an elevation reference plane of the second device, and the second device may determine the elevation of the second device with respect to the elevation reference plane (e.g., based on data from the one or more sensors). The second reference may be an azimuth reference plane of the second device, and the second device may determine the azimuth of the second device with respect to the azimuth reference plane (e.g., based on data from the one or more sensors).

In some embodiments, the second device may include a plurality of UWB devices. The second device may determine the AoA from the first device according to measurements obtained between the plurality of UWB devices of the second device and the plurality of UWB devices of the first device, and the plurality of values from the report received from the first device. For example, the second device may determine a first AoA from the second device using measurements obtained between the plurality of UWB devices of the second device and the plurality of UWB devices of the first device. The second device may determine a second AoA from the second device using the plurality of values from the report received from the first device. The second device may determine the AoA based on the first and second AoAs. For example, the second device may compute an average of the first and second AoAs to determine the AoA from the first device. As another example, the second device may compare the first AoA to the second AoA. Where the first AoA is within a predetermined threshold of the second AoA, the second device may select one of the first or second AoA to use as the AoA from the first device. On the other hand, where first AoA is not within a predetermined threshold of the second AoA, the second device may select the first AoA to use as the AoA from the first device.

In some embodiments, the second device may receive a plurality of reports from the first device. For example, the second device may receive a first report from the first device at a first time instance and a second report from the first device at a second time instance. The second device may determine a trajectory of the first device according to the first and second report. For example, the second device may determine a first AoA from the first device using the first report for the first time instance and a second AoA from the first device using the second report for the second time instance. The second device may compare the first AoA to the second AoA do determine a change in the AoA. The second device may use the change in the AoA from the first and second time instances to determine a trajectory of the first device.

Figure 7:
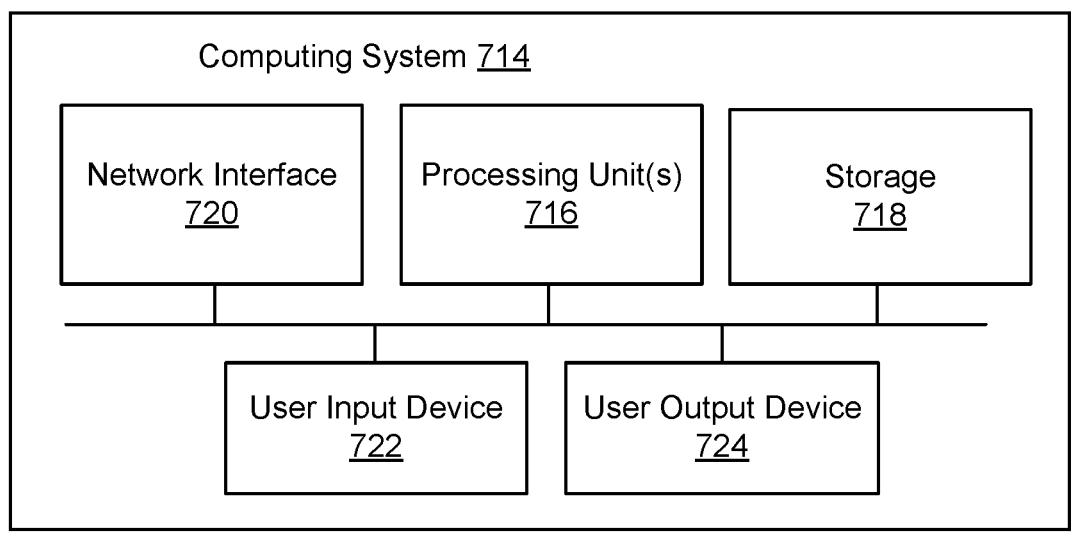
FIG. 7 is a block diagram of a computing environment according to an example implementation of the present disclosure.

Various operations described herein can be implemented on computer systems. FIG. 7 shows a block diagram of a representative computing system 714 usable to implement the present disclosure. In some embodiments, the console 110, the HWD 150 or both of FIG. 1 are implemented by the computing system 714. Computing system 714 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 714 can be implemented to provide VR, AR, MR experience. In some embodiments, the computing system 714 can include conventional computer components such as processors 716, storage device 718, network interface 720, user input device 722, and user output device 724.

Network interface 720 can provide a connection to a wide area network (e.g., the Internet) to which WAN interface of a remote server system is also connected. Network interface 720 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 722 can include any device (or devices) via which a user can provide signals to computing system 714; computing system 714 can interpret the signals as indicative of particular user requests or information. User input device 722 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 724 can include any device via which computing system 714 can provide information to a user. For example, user output device 724 can include a display to display images generated by or delivered to computing system 714. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 724 can be provided in addition to or instead of a display.

Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 716 can provide various functionality for computing system 714, including any of the functionality described herein as being performed by a server or client, or other functionality associated with message management services.

It will be appreciated that computing system 714 is illustrative and that variations and modifications are possible. Computer systems used in connection with the present disclosure can have other capabilities not specifically described here. Further, while computing system 714 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:
    receiving, by a first device having at least one ultra-wideband (UWB) device, from a second device having a plurality of UWB devices, a report including a plurality of values comprising an elevation component of an angle of approach (AoA) from the first device and an azimuth component of the AoA from the first device, at least some of the plurality of values obtained according to measurements between the plurality of UWB devices of the second devices and the at least one UWB device of the first device; and
    determining, by the first device, an AoA from the second device, using the plurality of values from the report received from the second device.

2. The method of claim 1, further comprising:
    determining, by the first device using one or more sensors of the first device, an elevation of the first device with respect to a first reference, and an azimuth of the first device with respect to a second reference; and
    determining, by the first device, the AoA from the second device with respect to the first reference and the second reference, according to the elevation and the azimuth of the first device.

3. The method of claim 1, wherein the at least one UWB device is a single UWB device.

4. The method of claim 1, wherein the elevation component of the AoA from the first device is with respect to an elevation reference plane of the second device, and wherein the azimuth component of the AoA from the first device is with respect to an azimuth reference plane of the second device.

5. The method of claim 4, wherein the plurality of values further comprise a first angle between the elevation reference plane of the second device and true horizon, and a second angle between the azimuth reference plane of the second device and true north.

6. The method of claim 1, wherein the elevation component of the AoA from the first device is with respect to true horizon, and wherein the azimuth component of the AoA from the first device is with respect to true north.

7. The method of claim 1, wherein the report is included in a data packet sent using at least one of a UWB-based protocol, Bluetooth-based protocol, wireless local area network (LAN)-based protocol, near field communication (NFC)-based protocol, or cellular-based protocol.

8. The method of claim 1, wherein the at least one UWB device comprises a plurality of UWB devices, and wherein determining, by the first device, the AoA from the second device comprises:
    determining the AoA from the second device, according to measurements obtained between the plurality of UWB devices of the second device and the plurality of UWB devices of the first device, and the plurality of values from the report received from the second device.

9. The method of claim 1, wherein the report is a first report, and wherein the method further comprises:
receiving, by the first device, a second report from the second device subsequent to the first report; and
determining, by the first device, a trajectory of the second device according to the first report and the second report.

10. A first device, comprising:
at least one ultra-wideband (UWB) device; and
one or more processors configured to:
receive, from a second device having a plurality of UWB devices, a report including a plurality of values comprising an elevation component of an angle of approach (AoA) from the first device and an azimuth component of the AoA from the first device, at least some of the plurality of values obtained according to measurements between the plurality of UWB devices of the second devices and the at least one UWB device of the first device; and
determine an AoA from the second device, using the plurality of values from the report received from the second device.

11. The first device of claim 10, further comprising:
one or more sensors communicably coupled to the one or more processors, wherein the one or more processors are further configured to:
determine, using the one or more sensors of the first device, an elevation of the first device with respect to a first reference, and an azimuth of the first device with respect to a second reference; and
determine the AoA from the second device with respect to the first reference and the second reference, according to the elevation and the azimuth of the first device.

12. The first device of claim 10, wherein the at least one UWB device is a single UWB device.

13. The first device of claim 10, wherein the elevation component of the AoA from the first device is with respect to an elevation reference plane of the second device, and the azimuth component of the AoA from the first device is with respect to an azimuth reference plane of the second device.

14. The first device of claim 10, wherein the plurality of values further comprise a first angle between the elevation reference plane of the second device and true horizon, and a second angle between the azimuth reference plane of the second device and true north.

15. The first device of claim 10, wherein the elevation component of the AoA from the first device is with respect to true horizon, and the azimuth component of the AoA from the first device is with respect to true north.

16. The first device of claim 10, wherein the report is included in a data packet sent using at least one of a UWB-based protocol, Bluetooth-based protocol, wireless local area network (LAN)-based protocol, near field communication (NFC)-based protocol, or cellular-based protocol.

17. The first device of claim 10, wherein the at least one UWB device comprises a plurality of UWB devices, and determining the AoA from the second device comprises:
determining the AoA from the second device according to measurements obtained between the plurality of UWB devices of the second device and the plurality of UWB devices of the first device, and the plurality of values from the report received from the second device.

18. The first device of claim 10, wherein the report is a first report, and wherein the one or more processors are further configured to:
receive a second report from the second device subsequent to the first report; and
determine a trajectory of the second device according to the first report and the second report.

19. A non-transitory computer readable medium storing instructions that, when executed by one or more processors, cause the one or more processors in a first device to:
receive, from a second device having a plurality of UWB devices, a report including a plurality of values comprising an elevation component of an angle of approach (AoA) from a first device and an azimuth component of the AoA from the first device, at least some of the plurality of values obtained according to measurements between the plurality of UWB devices of the second devices and the at least one UWB device of the first device; and
determine an AoA from the second device, using the plurality of values from the report received from the second device.

20. The non-transitory computer readable medium of claim 19, wherein the instructions further cause the one or more processors to:
determine, using data from one or more sensors of the first device, an elevation of the first device with respect to a first reference, and an azimuth of the first device with respect to a second reference; and
determine the AoA from the second device with respect to the first reference and the second reference, according to the elevation and the azimuth of the first device.

* * * * *